United States Patent [19]

Long

[11] 3,900,829

[45] Aug. 19, 1975

[54] AIRPORT LOOP DETECTOR SYSTEM

[75] Inventor: Lennart Ernst Long, Waltham, Mass.

[73] Assignee: The United States of America as represented by the Secretary of the Department of Transportation, Washington, D.C.

[22] Filed: Oct. 17, 1973

[21] Appl. No.: 407,213

[52] U.S. Cl. .............................................. 340/38 L
[51] Int. Cl.$^2$ .......................................... G08G 1/01
[58] Field of Search ............ 340/38 R, 38 L, 258 C; 331/65, 8

[56] References Cited

UNITED STATES PATENTS

| | | | |
|---|---|---|---|
| 3,587,040 | 6/1971 | Fathauer | 340/38 L |
| 3,651,452 | 3/1972 | Friedman | 340/38 L |
| 3,685,013 | 8/1972 | Brickner | 340/38 L |
| 3,775,742 | 11/1973 | Koerner et al. | 340/38 L |
| 3,820,100 | 6/1974 | Ballinger et al. | 340/38 L |

*Primary Examiner*—Donald J. Yusko
*Attorney, Agent, or Firm*—Herbert E. Farmer; Harold P. Deeley, Jr.

[57] ABSTRACT

An airport loop detector system which includes demand tracking for stabilization. The system comprises a detector for detection of vehicles such as aircraft which enter the loop, and initiates action to automatically return the detector to its normal operating procedure if it should deviate therefrom.

8 Claims, 3 Drawing Figures

AIRPORT LOOP DETECTOR SYSTEM

BACKGROUND OF THE INVENTION:

1. Field of the Invention

The invention relates to the field of detecting vehicles such as airplanes.

2. Description of the Prior Art

The following U.S. Pat. Nos. disclose various prior attempts to achieve system stabilization and accuracy: 3,346,856 Doble et al, 3,373,374 Marosi, 3,397,364 Crandall, 3,675,195 Iwamoto, et al.

Doble et al U.S. Pat. No. 3,346,856 discloses an inductive loop vehicle detector having an automatic frequency control arrangement to compensate for gradual drift of a loop oscillator. Specifically, a loop oscillator and a voltage controlled oscillator (VCO) are connected to a mixer demodulator. The VCO has an automatic frequency control (AFC) in a feedback loop from the mixer to compensate for oscillator drift.

Marosi U.S. Pat. No. 3,373,374 discloses a self-tunable vehicle presence detector system wherein a delayed AFC is connected to the input of a voltage controlled multivibrator which generates an oscillatory signal. The system frequency is unknown prior to installation due to variables such as inductance but the system stabilizes and finds a point of normal operation between 30 and 100 KC.

Crandall U.S. Pat. No. 3,397,364 discloses an inductive loop metallic object detector. The system comprises two oscillators (one to VCO) locked into each other through a phase detector, and an error signal device in a feedback loop to the VCO.

Iwamoto et al U.S. Pat. No. 3,675,195 also discloses apparatus for detecting traffic information. Specifically the system may be provided with compensating means for changes in the inductance of the composite loop caused by changes in environmental conditions. The circuit determines whether an output pulse has been produced during a period when no vehicle is expected to be present.

There are prior art loop detectors which have been designed for use on highways. These detectors, however, are very prone to unreliable operation and are definitely not tailored to the aircraft industry. The two main factors which must be corrected for use on an airport by industrial road vehicle loop detectors are (1) inherent circuit drift from a preset operating point outside the confines of a sensitive operating range; (2) changes in the inductive loop and feedline inductance, capacitance and resistance. Of importance are two additional factors: (3) vandalism; and (4) temperature tracking problems. Field tests on airports and operational results from detector manufacturers have proven that drift and loop changes are due to (1) changes in taxiway environmental conditions; (2) aging of circuit components, inductive loop, feedline and potting materials; and (3) marginal performance of existing circuits designed to sell in a highly competitive market. The demand autoranging system according to the invention solves these problems.

Figure 1:
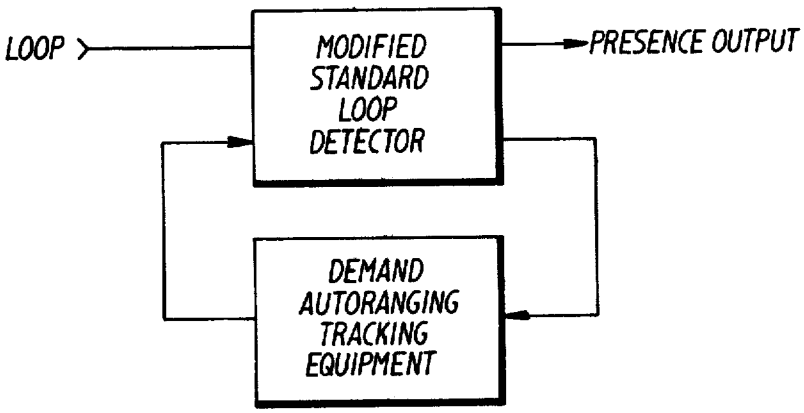
FIG. 1 illustrates the basic concept.

SUMMARY OF THE INVENTION:

The invention relates to an airport loop detector system which includes demand autoranging tracking for stabilization purposes. Specifically, the system comprises a modification to available industrial road loop detectors in order to use them for the reliable detection of aircraft. The major difficulties with current systems include inherent circuit drift from a preset operating point and changes in the inductive loop and feedline inductance, resistance and capacitance due to factors such as aging and environment. The modified system comprises a standard loop detector with a demand autoranging tracking system in a feedback control loop. The demand autoranging tracking system detects whether the output from the inductance loop detector is in the most sensitive region of the detector's D.C. amplifier. If the output from the inductance loop detector is out of its normal linear dynamic working range, the system initiates action automatically to demand the ranging element (a voltage controlled oscillator) to return this DC amplifier output within this window of most sensitive detection range.

The output of the voltage controlled oscillator, a triangular wave, is filtered through a low pass filter (VCO buffer, filter and buffer). The resultant wave is buffered and fed to a phase shifter (loop driver) which shifts the waveform by approximately 90°. The phase shifted signal is power amplified and applied to a three winding transformer (loop transformer) which is part of a tank circuit which includes a fixed capacitor and loop sensor. The reflected, phase shifted information is fed to a phase detector. A metal object passing over the loop sensor causes the phase detector to shift the duty ratio of its output squarewave signal. This square-wave is fed to a filter-integrator where it is smoothed.

A shift in the level of the D.C. component of the resultant waveform is a detection. This level shift is amplified and filtered by a buffer amplifier and then goes to a level detector. The system output signal is in the form of a presence-no presence digital signal.

The D.C. amplifier has a second output which is connected to a pseudo A/D converter which detects whether the amplifier is operating in or out of tolerance and operates a counter if an out of tolerance situation exists. The pseudo A/D converter consists of upper and lower window limit detector, upper and lower window inverter, and count up and down clock gates. Upon demand, a digital gate is opened and the signal fed to a D/A converter. The output signal from the converter is a scanning sawtooth which is fed to a VCO sweep driver which conditions amplitude and offset of the sawtooth which is used to tune the voltage controlled oscillator. This places the D.C. amplifier within the proper sensitivity setting which in turn causes the pseudo A/D converter to cease counting, stabilizing the oscillator.

The invention thus provides a stable and reliable circuit configuration due to the feedback principle utilized. It automatically compensates for all of the outlined problems within an extremely large range. It allows the unit to have total hands-off operation because it automatically tunes itself to its loop and feedline, hence minimizing vandalism problems. It tunes out inherent circuit drift by resetting the unit periodically to its most sensitive range. It also compensates for changes in the inductive loop and feedline inductance, capacitance, and resistance. It also compensates for temperature tracking.

This design has taken all desired improvements into account while keeping the loop detector cost-effective for airport use. Areas of improvement in the airport unit which are included, but not attributable to the demand autoranging tracking equipment, include immunity from interference, both radiated and conducted, lack of "presence" (meaning it has sufficient field strength so it does not miss any targets) and memory reset. A narrowband phase technique was chosen rather than some of the other broadband bridge or "self-tuning" amplitude techniques. This allows immunity from interference because of the steep attenuation skirts of the tank circuit selectivity curve.

The airport loop detector unit supplies sufficient field strength to detect the presence of all craft. Another improvement is that it allows automatic or remote reset of the memory rather than local pushbutton control. A further improvement is that the system can automatically tune itself to most sizes of airport loops and therefore needs no external controls at all.

DETAILED DESCRIPTION OF THE INVENTION:

The instant airport loop detector with demand autoranging tracking equipment is an electronic device which reliably detects the presence of aircraft and other vehicles on taxiways. The basic concept is shown in the block diagram in FIG. 1.

The demand autoranging tracking equipment system detects whether the output from a D.C. amplifier in the modified loop detector is in the most sensitive part of its dynamic range, and if out of range, initiates action to automatically demand (or respond from an external demand) the ranging element to reset the D.C. amplifier to its most sensitive point again.

Figure 2A:
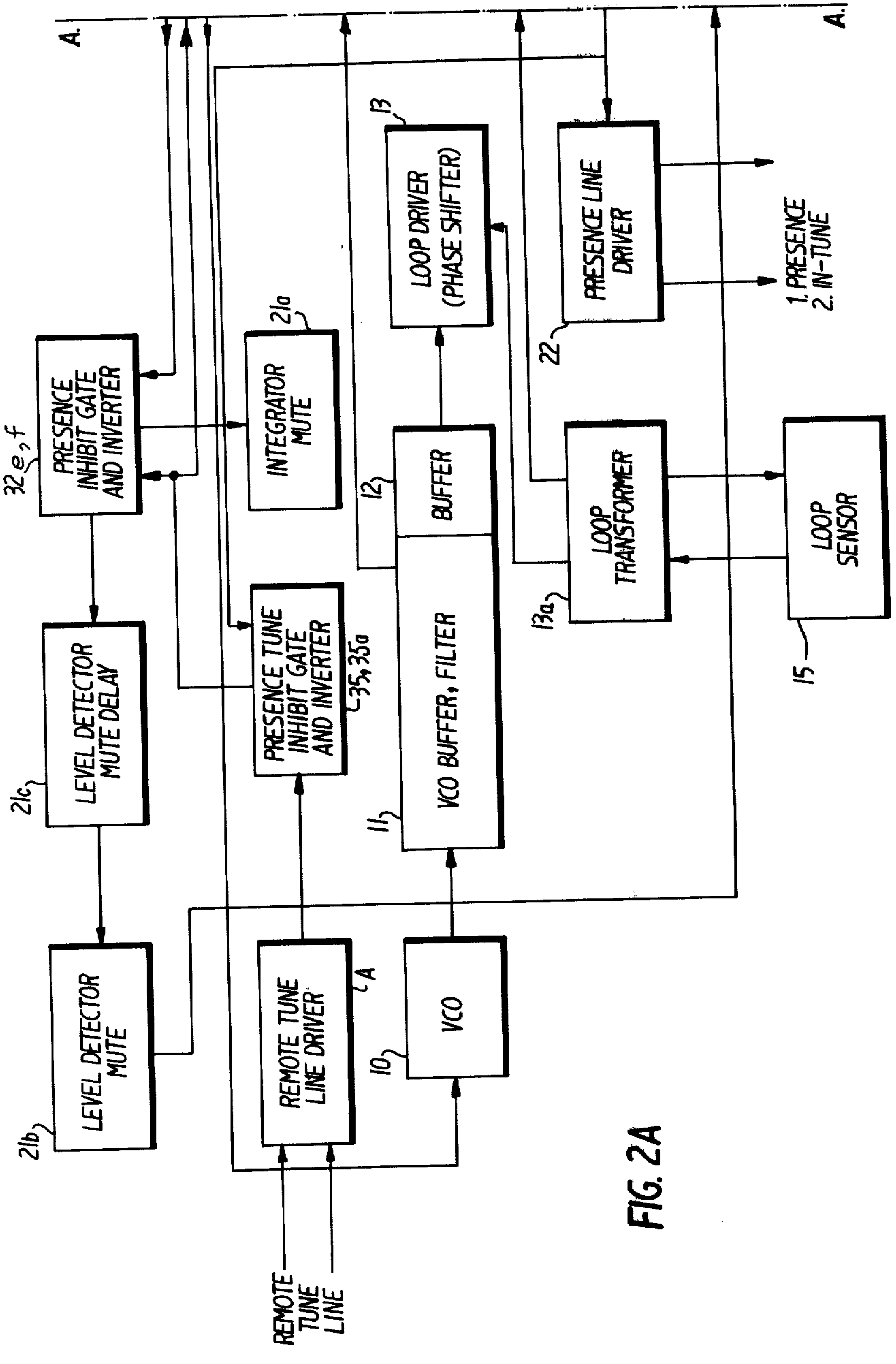
FIGS. 2A and 2B are block diagrams of the system according to the invention.
Figure 2B:
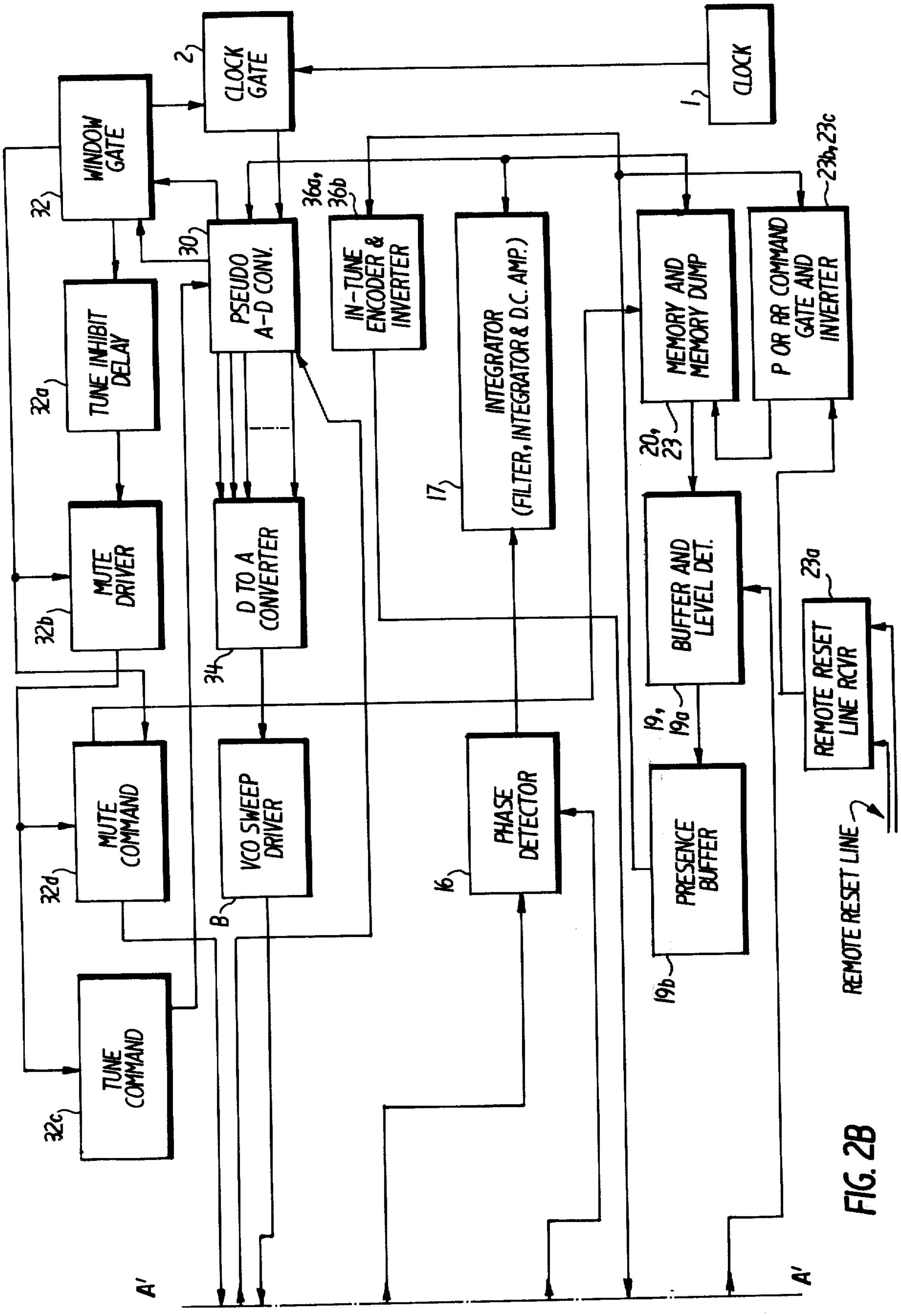

The block diagram of FIG. 2 shows voltage controlled oscillator 10, which produces a triangular wave connected to the input of low pass filter 11 (VCO buffer, filter and buffer). Low pass filter 11 filters out all unwanted harmonics of the output frequency of oscillator 10, which might otherwise interfere with other airport equipment. The output filter 11 is connected to a buffer stage 12. Phase shifter (loop driver) 13 is connected to the output of buffer stage 12, and phase shifts the input signal thereto by 90 degrees. The phase shifted signal is applied to a loop transformer 13A which may comprise a conventional three winding or trifilar transformer, which together with a capacitor (not shown) and inductive loop sensor 15, forms a tank circuit which transmits electromagnetic waves to generate a field at low frequencies.

The field comprises a loop which extends in height to that expected to be reached by the highest taxiing aircraft. If an aircraft enters the loop, eddy currents will be induced in the metal of the aircraft which will cause a net reduction in the inductance of the tank circuit heretofore described, and cause in effect a "reflected" wave to be sensed in the tank circuit, indicative of the presence of the aircraft. The "reflected" wave is out of phase with the transmitted wave, and these are compared in a phase sensitive detector 16, which has a first input connected to the output of buffer stage 12, and a second input connected to loop transformer 13A. The output duty cycle of the phase sensitive detector varies in response to the out-of-phase input signals is fed to filter-integrator 17 where it is smoothed. The output of filter integrator 17 is amplified by buffer 19 and level detector 19A after passing through a memory and memory dump 20, 23 to derive a presence indication caused by the variation in inductance of the tank circuit caused by the aircraft entering the loop. Memory device 20 and 23 is connected between D.C. amplifier 17 and buffer 19 and level detector 19A, and may comprise a capacitive circuit which holds its charge until the aircraft leaves the loop, or until leakage effects drain it (approximately one-half hour, for example). The memory device 20 and 23 is sensed by buffer stage 19B, and the output of the latter is applied to presence line driver 22 through gating (in-tune encoder and inverter 36A and 36B) to provide a "Presence" or "No Presence" digital signal. A remote reset for memory device 20 and 23 is provided by applying an external signal to memory dump circuit 23 through remote reset line receiver 23A, presence or remote reset command gate 23B, and presence or remote command gate inverter 23C. There are four modes to memory dump. One is presence dump (very long); quiescence dump (short); negative dump (very short); and fast dump (extremely short).

The output of D.C. amplifier 17 is also connected to pseudo analog-to-digital converter 30 which detects whether D.C. amplifier 17 is operating in or out of tolerance, and activates a counting operation to count continually if out of tolerance is detected. If out of tolerance is detected by the pseudo A/D converter 30, the window gate 32 will issue an internal demand to retune.

The count up clock gate 33A or count down clock gate 33B which controls the retune process must be activated by four signals, namely: (1) a signal from the upper window limit detector 30A or lower window detector 30B through their associated inverters 30C and 30D; (2) a tune command signal from tune command 32C; (3) a clock signal from the clock 1 through the clock gate 2; and (4) a signal from the PR-tune inhibit inverter 35A. The sequence of events may be as follows: There is no airplane on the loop so there is no presence. Therefore the output of the level detector buffer 19A and presence buffer 19B sends a signal of "No Presence" to presence-tune inhibit gate 35. This signal goes to the PR-tune inhibit inverter to the count up clock gate 33A and sets signal (4) above. The out of tolerance signal from the D.C. amplifier 17 sets either the upper window limit detector 30A or the lower limit detector 30B, and this signal passes through to the count up clock gate 33A through the lower window inverter 30D or to the count down clock gate 33B through the upper window inverter 30C. At the same time the window gate 32 is set. Hence we have signal requirement (1) above.

It is to be noted that functions 16, 17, 30, 36, 32*a–d*, 21*a–c*, and 35 are generated by integrated circuit (I.C.) means well known in the art which do not comprise the present invention. For example, phase detector 16 may be a Motorola MC 1596 or equivalent I.C. and integrator 17 may be an LM 709 I.C. in a combination of passive components. The pseudo A/D converter 30 may comprise an interconnection of TTL gates such as the SN 5420 I.C. and up-down counters such as the SN 5419 I.C. The in-tune encoder and inverter 36*a,b* may comprise part of an SN 5400 I.C. gate package. Also, the window gate 32 may be part of an SN 5400 I.C. package, the inhibit delay 32*a* may be an SN 54121 I.C. package, mute driver 32*b* may be another SN 54121

I.C., tune command $32c$ may be an SN 5474 I.C. and mute command $32d$ may be part of the same SN 5474 I.C. package. Integrator mute $21a$ may be any digitally controlled FET from discrete components or a four-in-one I.C. package to a Crystalonics CA 6–30; level detector mute $21b$ and level detector mute delay $21c$ are identical circuits to integrator mute $21a$. And presence tune inhibit gate and inverter $35a,b$ may be two gates of an SN 5400 I.C. package.

The window gate 32 opens the clock gate 2 which allows a periodic pulse signal from the clock 1 through to satisfy the input signal requirement (3) to the pseudo A/D converter 30 which in turn sends its digital code to the D/A converter 34.

The output signal from the window gate 32 is applied to a tune inhibit delay 32A which holds up the tune sequence to see if there is a presence signal present in the level detector 19. After the delay time the unit driver 32B initiates a mute command 32D through the presence inhibit gate 32E and presence inhibit inverter 32F. The integrator (D.C. amplifier 17) is muted through the integrator mute 21A which derives its signal from the presence inhibit inverter 32F. Also a signal from the presence inhibit inverter 32F initiates a level detector mute command through the level detector mute delay 21C, and level detector mute 21B. After this shut down sequence, a tune command comes from the tune command 32C to provide the final coincidence signal (2) above to begin the tune sequence.

Tuning is accomplished by sending a parallel digital signal to the digital-to-analog converter 34. The output waveform therefrom is scanning sawtooth which is modified in amplitude and offset by the VCO sweep driver (b) and then is used to tune the voltage controlled oscillator 10 which slews to a range of frequencies. This action places the D.C. amplifier 17 within the proper tolerance or sensitivity setting, which in turn stops the counting, hence stabilizing the voltage controlled oscillator 10. The tuning sequence may be initiated remotely through the remote tune line driver (A).

If an aircraft detection is being made when the D.C. amplifier 17 goes out of tolerance an inhibit signal is generated by the presence tune inhibit gate 35, which prevents auto tracking while aircraft "presence" exists. Also, when tracking, there is an output signal produced from the clock gate 2 which is fed to the tune encoder 36A and tune encoder inverter 36B through the pseudo A/D 30, and then to the output through the presence line driver circuitry. Simultaneously during tracking the mute circuits 21A and 21B prevent a false signal detection due to oscillator 10 being tuned.

This one additional signal that is provided at the output besides "presence" is a coded signal which is generated that allows one to externally realize when tuning is to take place and when it is taking place. The "in-tuning" signal is accomplished by deriving a gating signal from the presence buffer 10B and gating an output frequency from the clock gate 2 from the output presence driver 22, from the tune encoder 36A and tune encoder inverter 36B.

The demand autoranging tracking system thus detects whether the output from the D.C. amplifier 17 is in the most sensitive part of its dynamic range, and if out of range initiates action to automatically demand (or respond from an external demand) the ranging element to reset the amplifier to its most sensitive point again.

This retuning is accomplished by converting the analog signal from amplifier 17 to a digital one, gating this digital signal with a demand signal, and reconverting that digital signal to an analog signal which in turn drives voltage controlled oscillator 10. The voltage controlled oscillator tunes the tank circuit, which effects a change in the D.C. amplifier output.

It will be understood and appreciated by those skilled in the art from the foregoing description of the preferred embodiment that the invention can be practiced in many ways not specifically described herein without departing from the spirit and scope of the invention in its broader aspects as defined in the appended claims.

What is claimed is:

1. An object detector system to detect the entry of metallic objects into a defined loop comprising:
- an oscillator;
- a tank circuit connected to the oscillator to generate an electromagnetic field to define the loop, the inductance of the tank circuit varying in response to the entry of a metallic object into the loop;
- first incremental voltage frequency tuning means to derive a signal indicative of the change in inductance of the tank circuit;
- amplifier means to amplify said signal indicative of the change in inductance of the tank circuit;
- output means connected to the amplifier to provide an indication as to the "presence" or "no presence" of an object within the loop;
- second means connected to the amplifier to determine if the amplifier is operating in its most sensitive range; and
- frequency retuning means connected to the second means to cause a correction signal to be fed to the oscillator to drive the amplifier to operate in its most sensitive range.

2. The loop detector system recited in claim 1 wherein the retuning means comprises:
- range window means to derive a digital signal when the amplifier is operating out of its most sensitive range window;
- gating means;
- a digital-to-analog converter; and
- third analog means selectively operable to cause said gating means to gate the digital signal through to the digital-to-analog converter, the latter being connected to the oscillator, to apply thereto a signal to frequency tune the oscillator.

3. The loop detector system recited in claim 2 further comprising inhibit means to generate an inhibit signal to open circuit the gating means when the "presence" of an object within the loop is detected, to prevent retuning.

4. The loop detector system recited in claim 3 further comprising means to inhibit the output means during the retuning procedure and to mute undesired signal excursions to prevent a false "presence" signal from appearing at the output means.

5. The loop detector system recited in claim 4 further comprising means to produce a signal indicative of the retuning procedure taking place.

6. The loop detector system recited in claim 1 further comprising means to deactivate the retuning means when the "presence" of an object within the loop is detected to prevent retuning.

7. The loop detector system recited in claim 6 further comprising means to inhibit the output means during the retuning procedure to prevent a false "presence" signal from appearing at the output means.

8. The loop detector system recited in claim 7 further comprising means to produce a signal indicative of the retuning procedure taking place.

* * * * *